(12) United States Patent
Dan et al.

(10) Patent No.: US 12,412,075 B2
(45) Date of Patent: Sep. 9, 2025

(54) BEHAVIOR LEARNING SYSTEM, BEHAVIOR LEARNING METHOD AND PROGRAM

(71) Applicant: NIPPON TELEGRAPH AND TELEPHONE CORPORATION, Tokyo (JP)

(72) Inventors: Yuichiro Dan, Tokyo (JP); Keita Hasegawa, Tokyo (JP); Takafumi Harada, Tokyo (JP); Tomoaki Washio, Tokyo (JP); Yoshihito Oshima, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 575 days.

(21) Appl. No.: 17/624,552

(22) PCT Filed: Jul. 10, 2019

(86) PCT No.: PCT/JP2019/027300
§ 371 (c)(1),
(2) Date: Jan. 3, 2022

(87) PCT Pub. No.: WO2021/005739
PCT Pub. Date: Jan. 14, 2021

(65) Prior Publication Data
US 2022/0253677 A1 Aug. 11, 2022

(51) Int. Cl.
*G06N 3/045* (2023.01)
*G06N 3/08* (2023.01)

(52) U.S. Cl.
CPC ............... *G06N 3/045* (2023.01); *G06N 3/08* (2013.01)

(58) Field of Classification Search
CPC ................................. G06N 3/045; G06N 3/08
(Continued)

(56) References Cited

U.S. PATENT DOCUMENTS

| | | | |
|---|---|---|---|
| 2016/0188981 A1* | 6/2016 | Doerring | G06F 16/245 707/759 |
| 2019/0318244 A1* | 10/2019 | Alvarez | G06N 3/006 |
| 2020/0019871 A1* | 1/2020 | Balakrishnan | G06N 5/045 |

OTHER PUBLICATIONS

Ying Chen et al. (2018) "Evaluation of Reinforcement Learning Based False Data Injection Attack to Automatic Voltage Control", IEEE Transactions on Smart Grid.
(Continued)

*Primary Examiner* — Austin Hicks

(57) ABSTRACT

An action learning system includes a memory, and a processor configured to train, based on first data indicating a property of an environment in which data is collected from multiple devices and to which an action determined by a first neural network according to a state of the environment is applied and second data indicating a property of the environment to which the action is not applied, a second neural network that calculates a similarity degree between distributions of the first data and the second data, and train, after the second neural network is trained, the first neural network that determines an action according to the state of the environment, by reinforcement learning including, in a reward, a value that changes based on a relationship between a similarity degree and a parameter set by a user, the similarity degree being calculated by the second neural network based.

6 Claims, 13 Drawing Sheets

(58) Field of Classification Search
USPC .......................................................... 706/15
See application file for complete search history.

(56) References Cited

OTHER PUBLICATIONS

Martin Arjovsky et al. (2017) "Wasserstein GAN", Courant Institute of Mathematical Sciences Facebook AI Research.

* cited by examiner

BEHAVIOR LEARNING SYSTEM, BEHAVIOR LEARNING METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/027300, filed on 10 Jul. 2019, the disclosure of which is hereby incorporated herein by reference in its entirety.

TECHNICAL FIELD

The present invention relates to an action learning system, an action learning method, and a program.

BACKGROUND ART

As illustrated in FIG. 1, in Society 5.0, emergence of a service has been expected that (1) collects and (2) analyzes sensor data from a huge number of IoT devices in the cyber space and (3) distributes the result in order to optimize the physical space.

With respect to the above, for such a service, a threat of attack that injects false information into sensor data (false information injection attack) has been pointed out.

FIG. 2 is a diagram for describing the influence of injection of false information. As illustrated in FIG. 2, when false information is injected into sensor data, for example, there is a possibility that a property (or characteristic) of observed sensor data changes, an erroneous analysis result based on the changed property (or characteristic) is distributed, and optimization is inhibited.

Therefore, study of countermeasure techniques for false information injection attack has begun (e.g., Non-Patent Literature 1). Steps necessary to establish a countermeasure technique for false information injection attack include the following:

Generation of attack data: generating sensor data to be obtained in the case where an attack is made (attack data)

Analysis of the attack data: analyzing the generated attack data

Consideration of a countermeasure technique:

considering a countermeasure technique based on the analysis result.

Verification of the countermeasure technique: verifying the effect of the considered countermeasure technique Conventionally, for generation of attack data, as illustrated in FIG. 3, there has been a technique employing reinforcement learning using only a degree of influence (influence degree) on an environment as a reward in order to cause an agent (neural network) to acquire an action in which an attacker makes a desired influence on the environment. For example, in Non-Patent Literature 1, this conventional technique is used for generation of attack data of false information injection attack on a smart grid system. Note that the influence degree is, for example, an index indicating deviation of an index of optimization in the case where an attack is made from that in the case where no attack is made.

Note that the smart grid system in Non-Patent Literature 1 is a system that collects and analyzes sensor data and performs control based on the analysis result in order to optimize power distribution. Further, false information injection attack in Non-Patent Literature 1 is an attack that injects false sensor data in order to inhibit optimization of power distribution.

CITATION LIST

Non-Patent Literature

Non-Patent Literature 1: Ying Chen, Shaowei Huang, Feng Liu, Zhisheng Wang and Xinwei Sun, "Evaluation of Reinforcement Learning Based False Data Injection Attack to Automatic Voltage Control," IEEE Transactions on Smart Grid (2018)

SUMMARY OF THE INVENTION

Technical Problem

When a neural network is caused to acquire an action in which an attacker makes a desired influence on the environment, it may be desired that the neural network is caused to acquire such an action that a predetermined property of the environment (any of various quantities that characterize the environment (e.g., sensor data)) is similar to the property under a specific condition (e.g., when no attack is made), or different from the property under the specific condition, in addition to simply increasing the influence degree.

For example, in the above case of false information injection attack on the smart grid, in order to generate attack data of an attack in which it is difficult to notice an abnormality by simply monitoring the sensor data, or to generate attack data of an attack in which it is easy to notice an abnormality by simply monitoring the sensor data, it is conceivable that a neural network acquires an attack in which a quantity that characterizes the sensor data (e.g., average, variance, or percentile) is similar to that in the case where no attack is applied, or different from that in the case where no attack is applied.

However, since only the influence degree on the environment is a reward in the conventional technique using only the influence degree as a reward, it is not possible to control an action that the neural network is caused to acquire, based on the closeness between the property of the environment in the case where the action is not taken and the property of the environment in the case where the action is taken, as illustrated in FIG. 4.

The present invention has been made in view of the above points, and aims to make it possible to control an action that the neural network is caused to acquire, based on the closeness between the property of the environment in the case where the action is not taken and the property of the environment in the case where the action is taken.

Means for Solving the Problem

Therefore, in order to solve the above problem, an action learning system includes: a first training unit that trains, based on first data indicating a property of an environment to which an action, determined by a first neural network according to a state of the environment in which data is collected from a plurality of devices, is applied and second data indicating a property of the environment to which the action is not applied, a second neural network that calculates a similarity degree between a distribution of the first data and a distribution of the second data; and a second training unit that, after the second neural network is learned by the first training unit, trains the first neural network that determines an action corresponding to the state of the environment by reinforcement learning including, in a reward, a value that changes based on a relationship between the similarity degree calculated by the second neural network based on third data indicating a property of the environment to which the action determined by the first neural network is applied, and a parameter set by a user.

Effects of the Invention

It becomes possible to control an action that the neural network is caused to acquire, based on the closeness between the property of the environment in the case where the action is not taken and the property of the environment in the case where the action is taken.

DESCRIPTION OF EMBODIMENTS

Figure 1:
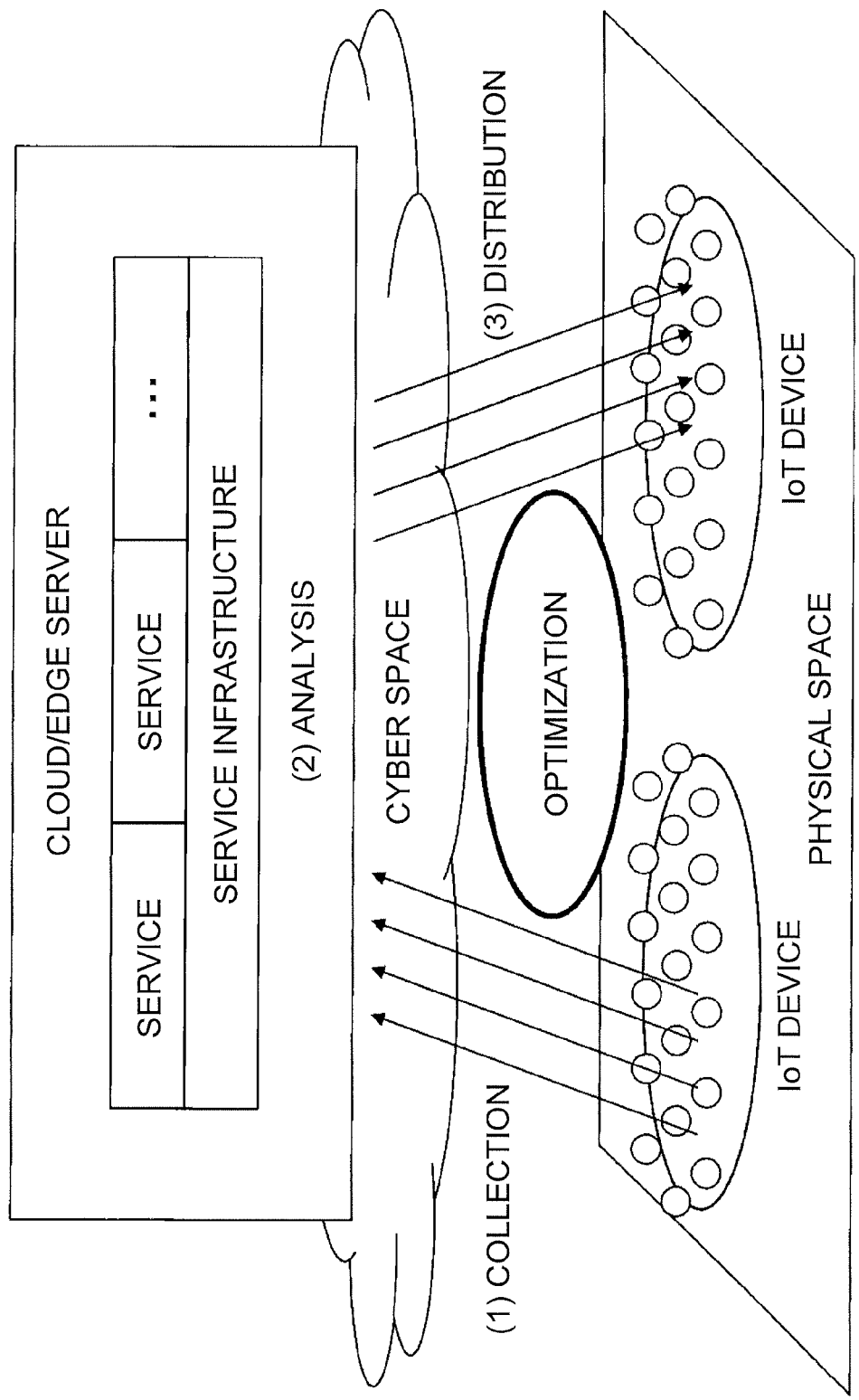
FIG. 1 is a diagram for describing a service expected in Society 5.0.
Figure 2:
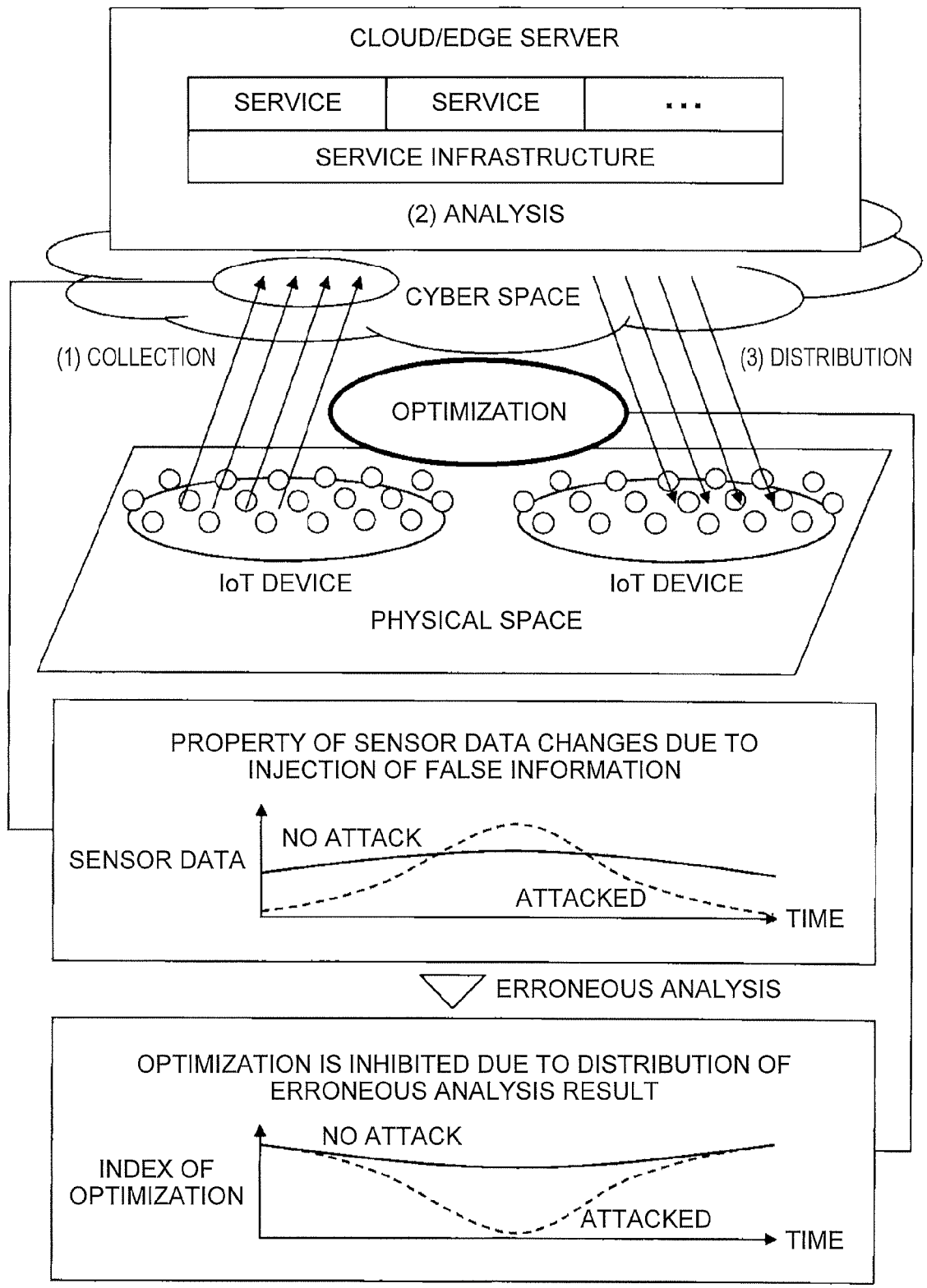
FIG. 2 is a diagram for describing the influence of injection of false information.
Figure 3:
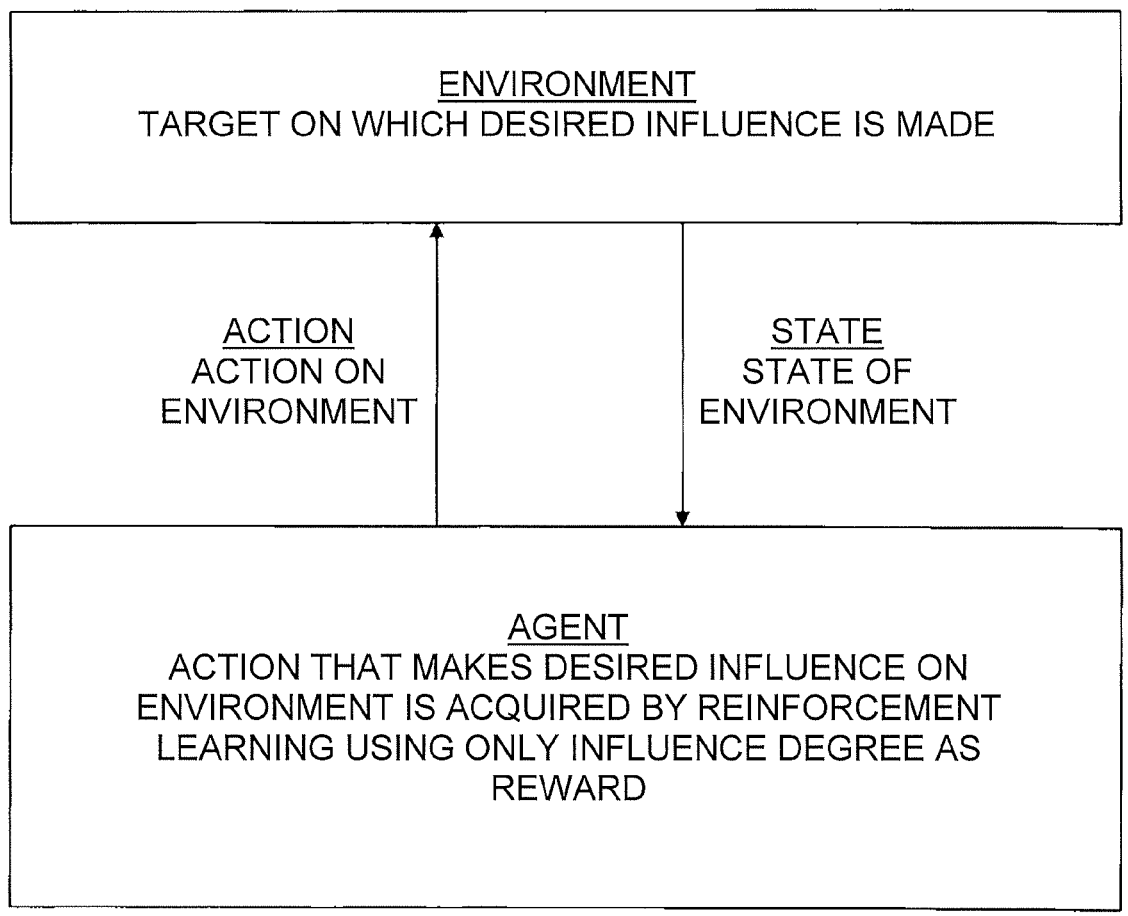
FIG. 3 is a diagram for describing a technique employing reinforcement learning using only a degree of influence (influence degree) on an environment as a reward for generation of attack data.
Figure 4:
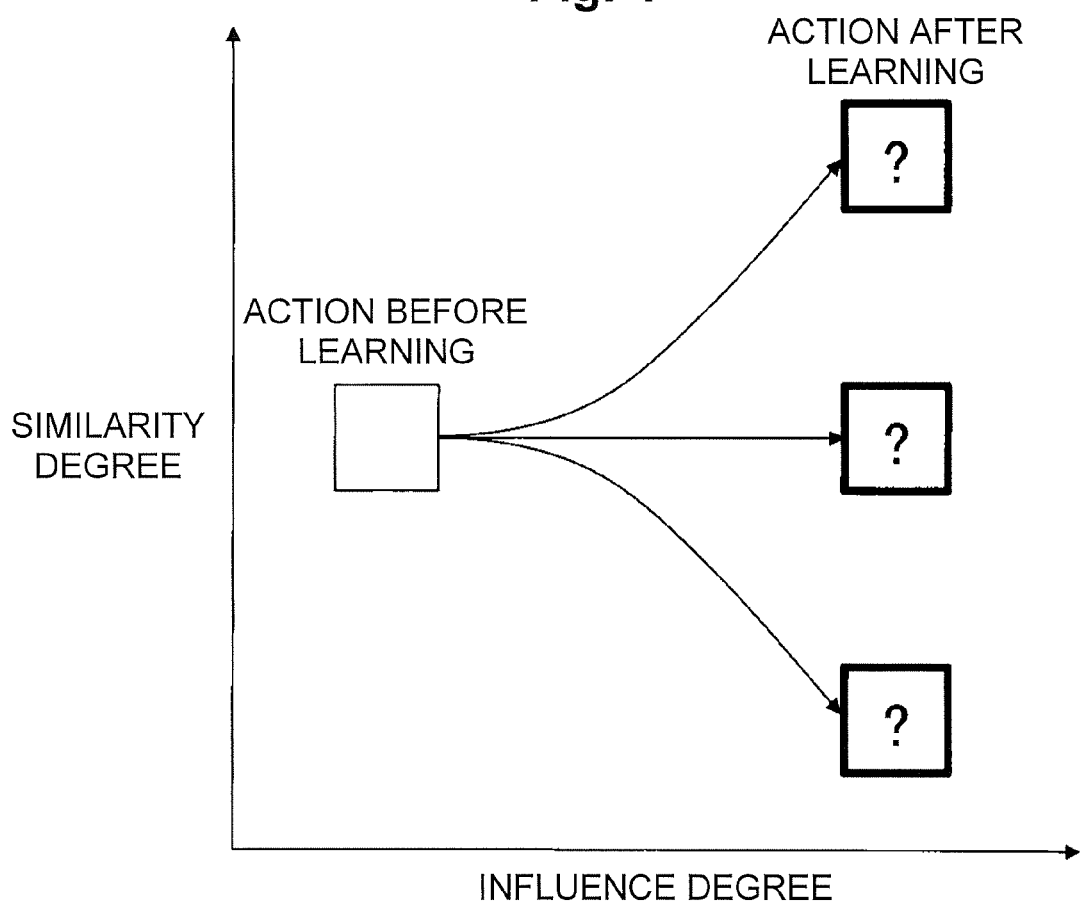
FIG. 4 is a diagram for describing a problem of the conventional technique.

Hereinafter, an embodiment of the present invention will be described with reference to the drawings. In this embodiment, as illustrated in FIG. 1, a service is assumed to be present that (1) collects and (2) analyzes sensor data from a huge number of IoT devices in the cyber space and (3) distributes the result in order to optimize the physical space. In such an assumption, in this embodiment, a method of learning an action for generating attack data as a countermeasure for an attack of injecting false information into the sensor data (false information injection attack) will be described.

Figure 5:
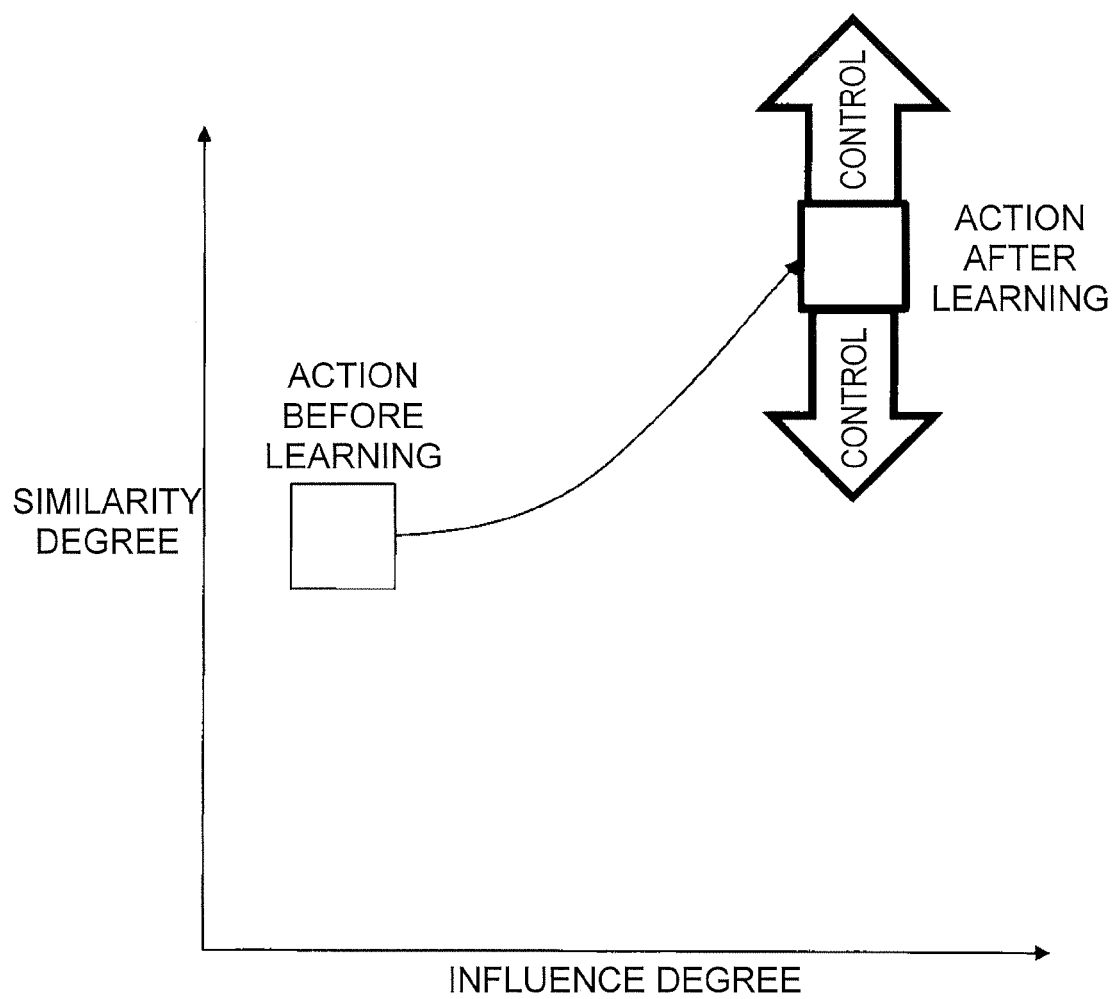
FIG. 5 is a diagram for describing a basic policy of an embodiment of the present invention.

FIG. 5 is a diagram for describing a basic policy of the embodiment of the present invention. As illustrated in FIG. 5, in this embodiment, for a property (or characteristic) of an environment (the physical space and the cyber space in FIG. 1) (e.g., a quantity that characterizes the sensor data (e.g., average, variance, or percentile)), a mechanism, for controlling a degree of similarity (hereinafter referred to as the "similarity degree") between a property under a specific condition (a situation where no attack is made) and a property under a situation where an attack is made, is added for learning of the action for generating attack data. As an approach therefor, this embodiment employs reinforcement learning using a value based on the similarity degree as a reward for generation of attack data of false information injection attack.

Figure 6:
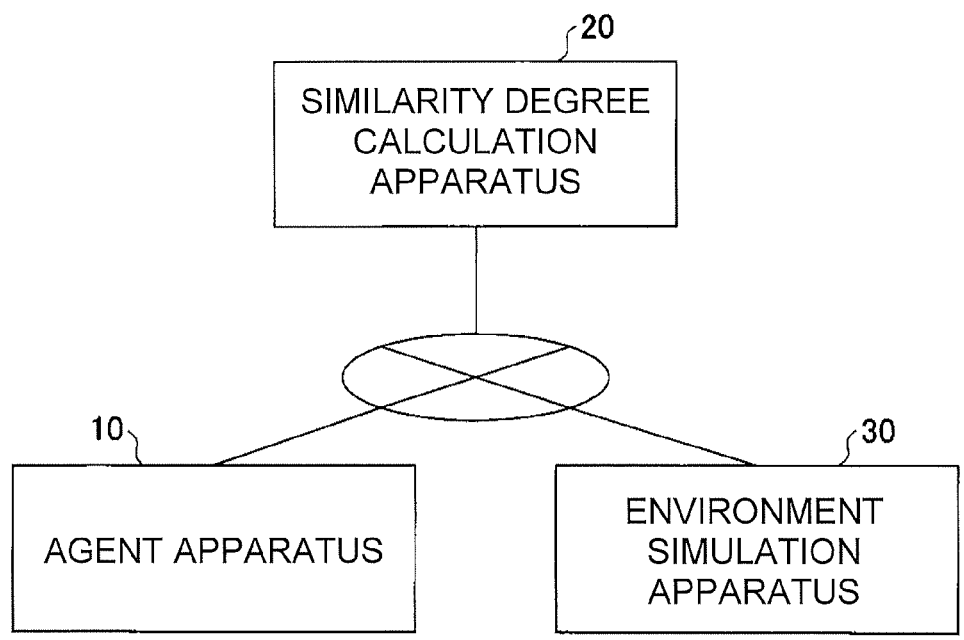
FIG. 6 is a diagram illustrating an example configuration of an action learning system in an embodiment of the present invention.

FIG. 6 is a diagram illustrating an example configuration of an action learning system in the embodiment of the present invention. In FIG. 6, an environment simulation apparatus 30, an agent apparatus 10, and a similarity degree calculation apparatus 20 are connected via a network such as a LAN (local area network), for example. Each apparatus is composed of one or more computers. However, any two or more of the environment simulation apparatus 30, the agent apparatus 10, and the similarity degree calculation apparatus 20 may be implemented using the same computer (e.g., one computer).

Figure 7:
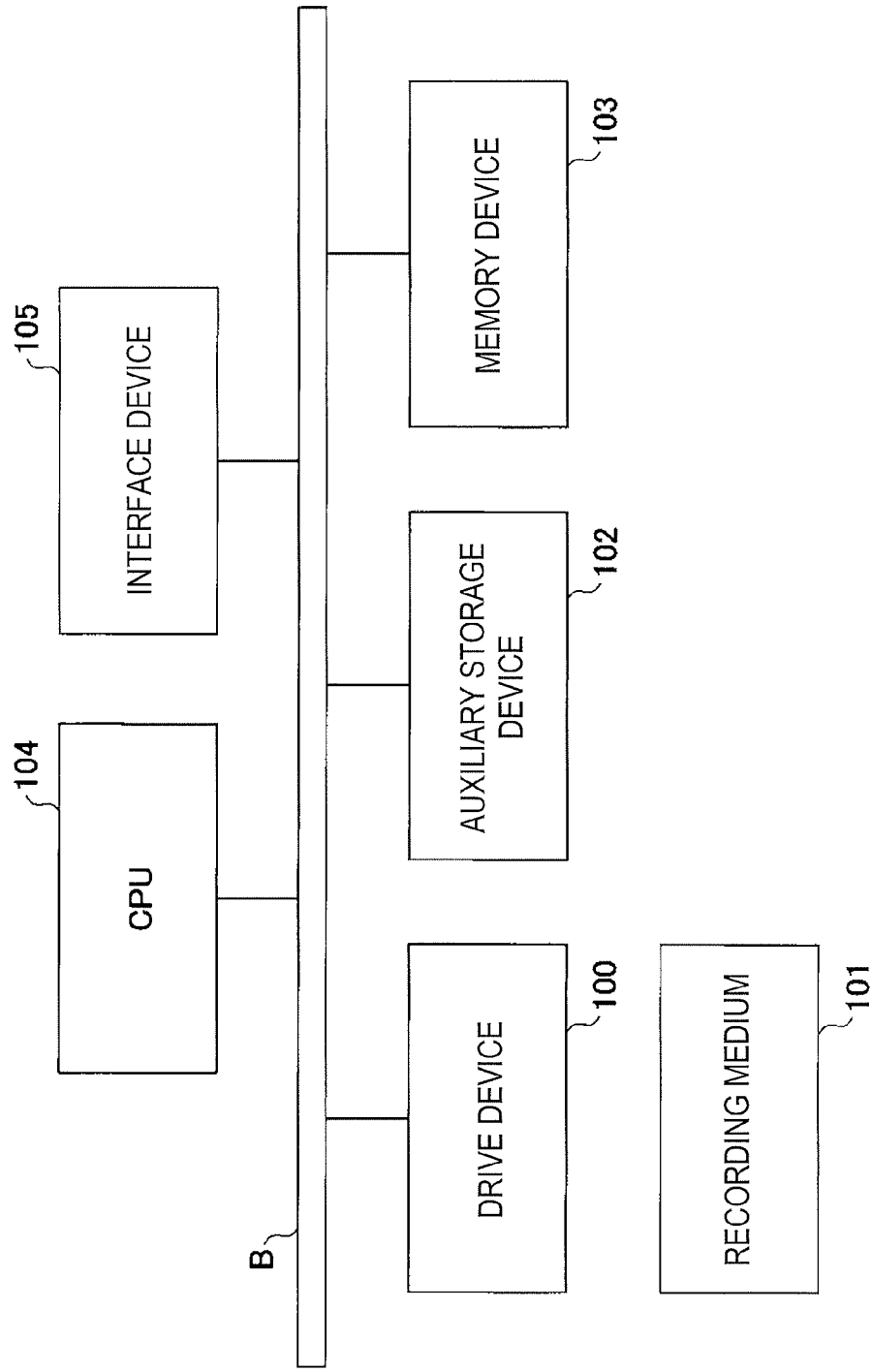
FIG. 7 is a diagram illustrating an example hardware configuration of an agent apparatus 10 in the embodiment of the present invention.

FIG. 7 is a diagram illustrating an example hardware configuration of the agent apparatus 10 in the embodiment of the present invention. The agent apparatus 10 in FIG. 7 includes a drive device 100, an auxiliary storage device 102, a memory device 103, a CPU 104, an interface device 105, and the like that are connected to one another via a bus B.

A program implementing the processes in the agent apparatus 10 is provided via a recording medium 101 such as a CD-ROM. When the recording medium 101 storing the program is set in the drive device 100, the program is installed in the auxiliary storage device 102 from the recording medium 101 via the drive device 100. However, it is not necessary to install the program from the recording medium 101, the program may be downloaded from another computer via a network. The auxiliary storage device 102 stores the installed program, and also stores necessary files, data, and the like.

Upon an instruction to start the program, the memory device 103 reads the program from the auxiliary storage device 102 and stores the program. The CPU 104 executes functions related to the agent apparatus 10 according to the program stored in the memory device 103. The interface device 105 is used as an interface for connecting to a network.

Note that the environment simulation apparatus 30 and the similarity degree calculation apparatus 20 may also have the hardware configuration illustrated in FIG. 7.

Figure 8:
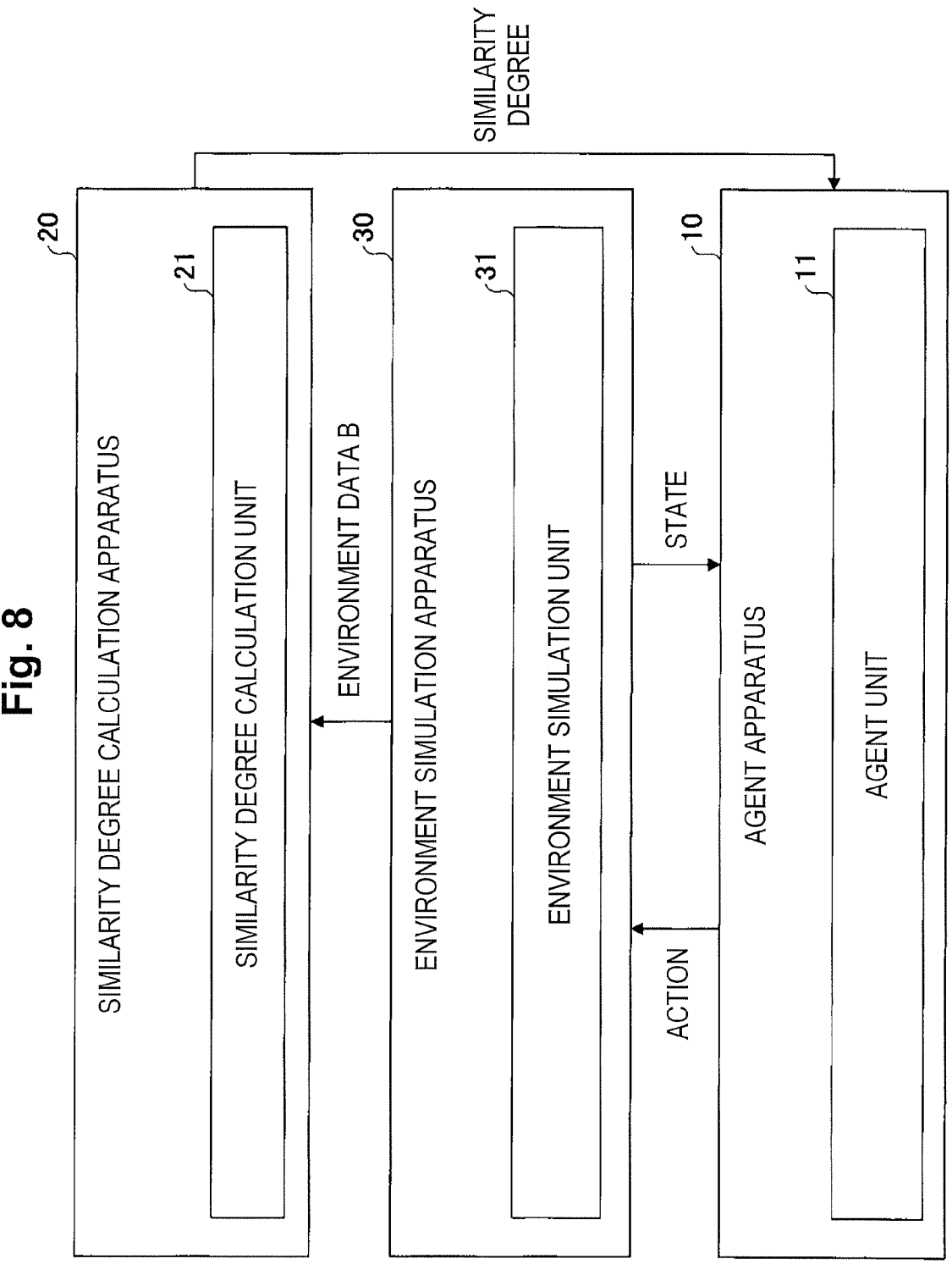
FIG. 8 is a diagram illustrating an example functional configuration of the action learning system in the embodiment of the present invention.

FIG. 8 is a diagram illustrating an example functional configuration of the action learning system in the embodiment of the present invention.

In FIG. 8, the environment simulation apparatus 30 includes an environment simulation unit 31. The environment simulation unit 31 simulates the environment (e.g., the physical space and the cyber space in FIG. 1). However, the actual (actually operated) physical space and server space may be used as the environment simulation apparatus 30. In this case, the environment simulation unit 31 is not needed. Note that the environment simulation unit 31 is implemented by processes that one or more programs (e.g., one or more simulation programs) installed in the environment simulation apparatus 30 cause the environment simulation apparatus 30 to execute.

The agent apparatus 10 includes an agent unit 11. The agent unit 11 is a neural network that functions as an agent that applies an action (an attack) corresponding to the state of the environment (the environment simulation apparatus 30) to the environment. The strategy of the action corresponding to the state of the environment is learned by the method described later. Note that the agent unit 11 is implemented by processes that one or more programs installed in the environment simulation apparatus 30 cause the agent apparatus 10 to execute.

The similarity degree calculation apparatus 20 includes a similarity degree calculation unit 21. The similarity degree calculation unit 21 is a neural network that calculates a similarity degree between the distribution of a set (a group of environment data A) of data (hereinafter referred to as "environment data A") indicating the property of the environment under a specific condition (a situation where no attack is made) and the distribution of a set (a group of environment data B) of data (hereinafter referred to as "environment data B") indicating the property of the environment indicating the property in a situation where an attack is made. Note that when a distinction is not made between the environment data A and the environment data B, the environment data A and the environment data B are simply referred to as "environment data". Further, the distribution of an environment data group refers to the distribution of points where each environment data included in the environment data group is set as one point in a dimension of a parameter of the environment data.

As illustrated in FIG. 8, the state of the environment is input from the environment simulation apparatus 30 to the agent apparatus 10. An action determined by the agent unit 11 according to the state input to the agent apparatus 10 is applied from the agent apparatus 10 to the environment. The environment data B generated (or calculated) by the environment simulation unit 31 according to the action applied from the agent apparatus 10 to the environment is input from the environment to the similarity degree calculation apparatus 20. The similarity degree calculated by the similarity degree calculation unit 21 based on the environment data B input from the environment to the similarity degree calculation apparatus 20 and a plurality of environment data A (the group of the environment data A) prepared in advance is input from the similarity degree calculation apparatus 20 to the agent apparatus 10.

In this embodiment, an example in which a smart grid system is the environment will be described. In this case, it is assumed that injection of false information into the voltage, power, current, phase, or the like of a smart meter or substation inhibits optimal low-delay power distribution according to supply and demand of power. Accordingly, in this embodiment, the environment data is, for example, a set of part or all of values of voltages, powers, currents, phases, and the like at a plurality of smart meters or substations to be monitored in the smart grid system, or a set of part or all of statistics such as average, variance, percentile, or frequency in the case of summing up the values in a time or space within a certain range.

Further, the similarity degree is a value obtained by inverting the sign of a real value representing a distance between the distribution of the environment data group (the group of the environment data A) in the case where no attack is made (the case where no action is applied) and the distribution of the environment data group (the group of the environment data B) in the case where an attack is made (the case where no action is applied). Accordingly, in this embodiment, the similarity degree is an index indicating that a degree of similarity is higher as the value increases, and indicating that a degree of similarity is lower as the value decreases.

Further, the state of the environment (hereinafter also simply referred to as the "state") is, for example, a set of part or all of values of voltages, powers, currents, or phases at a plurality of smart meters or substations to be monitored in the smart grid system, or a set of part or all of statistics such as average, variance, percentile, or frequency in the case of summing up the values in a time or space within a certain range.

Note that although environment data and a state have the same definition, parameters constituting the environment data and parameters constituting the state may be different from each other.

Further, an action taken by an agent (hereinafter also simply referred to as the "action") is, for example, a set of part or all of false values of voltages, powers, currents, phases, and the like at a plurality of smart meters or substations to be monitored that are injected into the smart grid system. Applying an action may be changing part or all of voltages, powers, currents, or phases at part or all of smart meters or substations existing in the environment, may be inputting data on one or more new smart meters or substations (a set of part or all of false values of voltages, powers, currents, phases, and the like) to the environment, or may be both.

Figure 9:
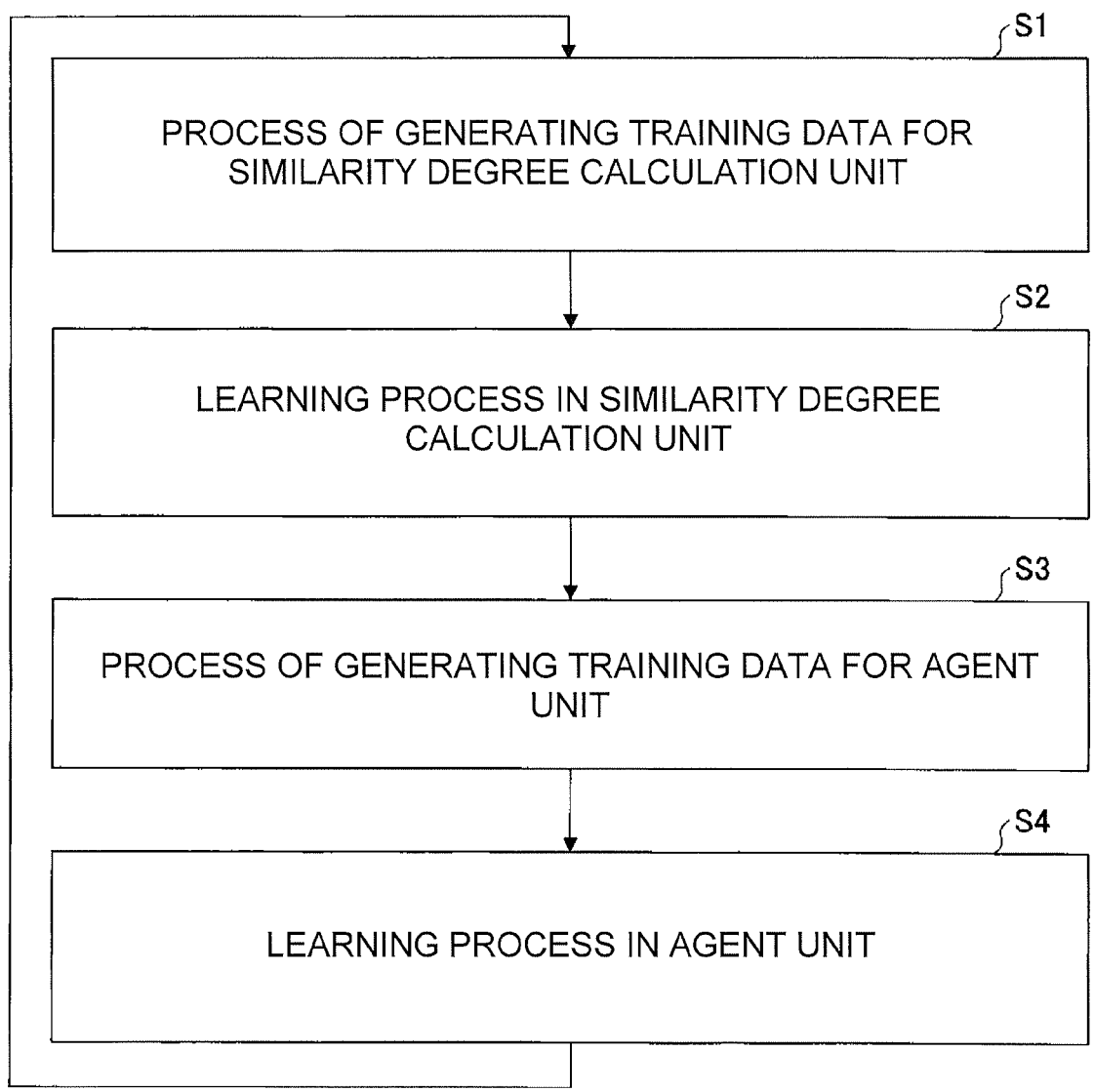
FIG. 9 is a diagram for describing an outline of a processing procedure executed in the action learning system.

Hereinafter, a processing procedure executed in the action learning system will be described. FIG. 9 is a diagram for describing an outline of the processing procedure executed in the action learning system.

In step S1, a process of generating training data for the similarity degree calculation unit 21 is executed. Specifically, the environment data B that is generated each time the action is applied (i.e., for each attack) while the agent unit 11 iterates applying an action to the environment is accumulated in the similarity degree calculation apparatus 20 as training data for the similarity degree calculation unit 21.

Then, at any timing after the end of step S1, the similarity degree calculation unit 21 executes a learning process (S2). Specifically, based on the group of the environment data A prepared in advance and the group of the environment data B accumulated in step S1, the similarity degree calculation unit 21 trains a neural network (hereinafter referred to as "similarity degree calculation model") to be used to calculate an approximate value of a distance (the similarity degree) between the distribution of the group of the environment data A and the distribution of the group of the environment data B.

Then, at any timing after the end of step S2, a process of generating training data for the agent unit 11 is executed (S3). Specifically, the training data for a neural network (hereinafter referred to as an "agent model") that determines a strategy of an action taken by the agent unit 11 (approximates the strategy) while the agent unit 11 iterates applying an action to the environment is accumulated in the agent apparatus 10.

Then, at any timing after the end of step S3, the agent unit 11 executes a learning process (S4). That is, the agent unit 11 trains the agent model based on the training data accumulated in step S3.

Steps S1-S4 are iterated a plurality of times (e.g., a preset number of times). Hereinafter, each iteration of steps S1-S4 is referred to as a "phase".

Figure 10:
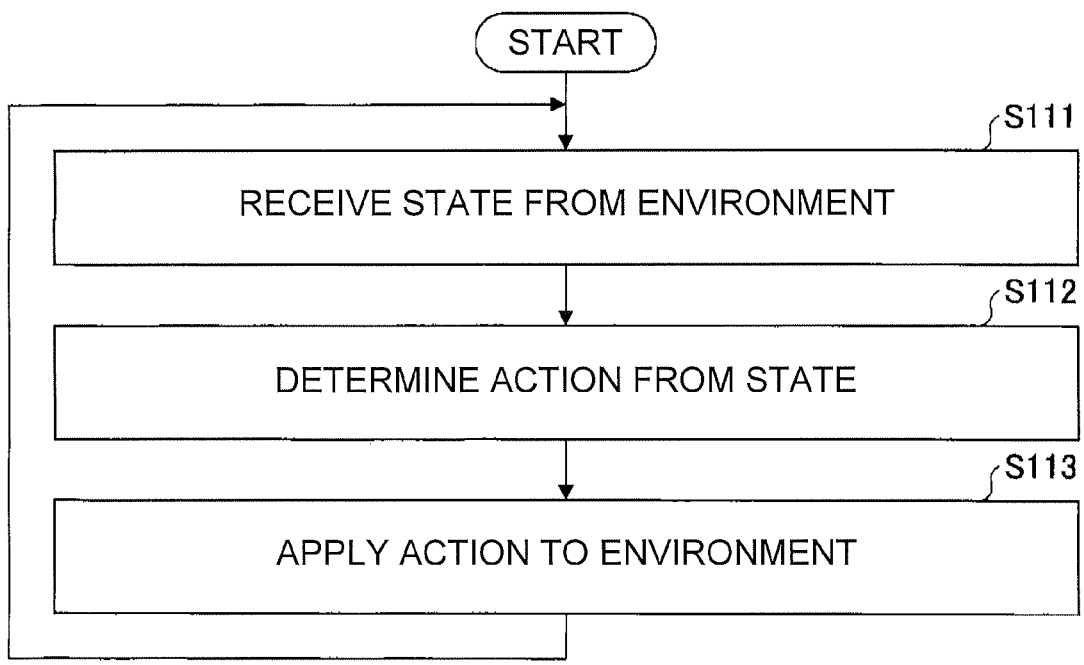
FIG. 10 is a flowchart for describing an example of a processing procedure executed by the agent apparatus 10 in a process of generating training data for a similarity degree calculation unit 21.

Then, details of step S1 will be described. FIG. 10 is a flowchart for describing an example of the processing procedure executed by the agent apparatus 10 in the process of generating the training data for the similarity degree calculation unit 21.

In step S111, the agent unit 11 receives or obtains a state from the environment. Then, the agent unit 11 inputs the state to the agent model to determine an action by using the agent model (S112). Then, the agent unit 11 applies the action to the environment (S113), and iterates step S111 and the subsequent steps.

Figure 11:
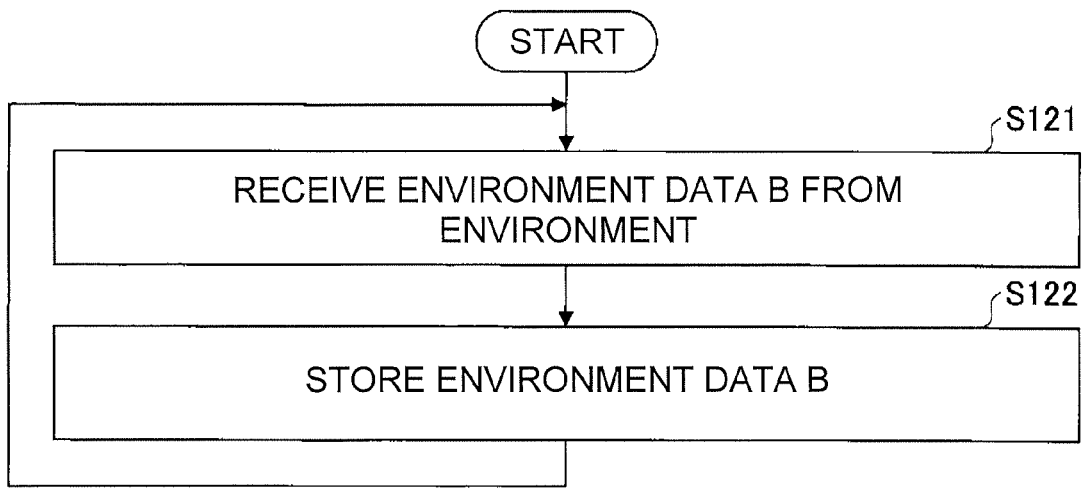
FIG. 11 is a flowchart for describing an example of a processing procedure executed by the similarity degree calculation apparatus 20 in the process of generating the training data for the similarity degree calculation unit 21.

FIG. 11 is a flowchart for describing an example of the processing procedure executed by the similarity degree calculation apparatus 20 in the process of generating the training data for the similarity degree calculation unit 21.

In step S121, the similarity degree calculation unit 21 receives or obtains, from the environment, the environment data B (the environment data in the situation of being attacked) corresponding to an action applied by the agent unit 11 in step S113 in FIG. 10. Then, the similarity degree calculation unit 21 stores the environment data B in the similarity degree calculation apparatus 20 (S122), and iterates step S121 and the subsequent steps.

Accordingly, by iterating the processing procedures in FIG. 10 and FIG. 11, the group of the environment data B is accumulated in the similarity degree calculation apparatus 20.

Note that step S1 may be executed, for example, until an action is applied a predetermined number of times, or until a predetermined number of environment data B are accumulated in the similarity degree calculation apparatus 20.

Figure 12:
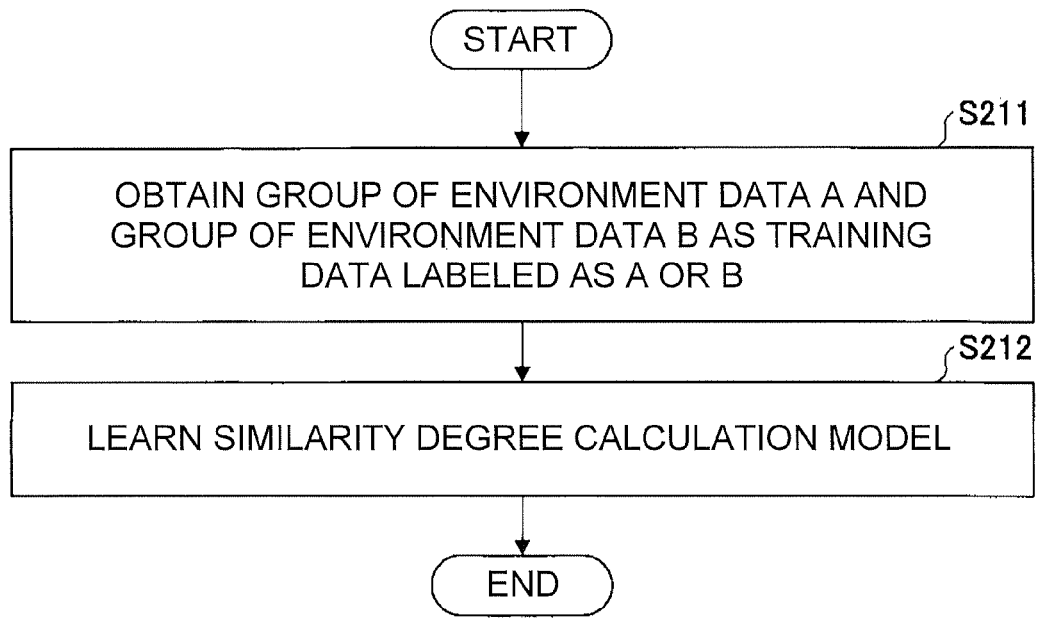
FIG. 12 is a flowchart for describing an example of a processing procedure of a learning process in the similarity degree calculation unit 21.

Then, details of step S2 in FIG. 9 will be described. FIG. 12 is a flowchart for describing an example of a processing procedure of a learning process in the similarity degree calculation unit 21.

In step S211, the similarity degree calculation unit 21 obtains the group of the environment data A stored in advance in the similarity degree calculation apparatus 20, and the group of the environment data B accumulated in the similarity degree calculation apparatus 20 in step S1 of the current phase as training data with labels for distinguishing between the environment data A and B.

Then, the similarity degree calculation unit 21 trains the similarity degree calculation model that approximates a similarity degree between the distribution of the group of the environment data A and the distribution of the group of the environment data B (S212).

Representative distances between distributions include the following (JM. Arjovsky, S. Chintala, L. Bottou, "Wasserstein GAN," arXiv:1701.07875v3(2017)):

Total variation (TV),
Kullback-Leibler divergence (KL),
Jensen-Shannon divergence (JS), and
Earth Mover distance (EM).

Here, considering the relationship between a distance and convergence, for two probability distributions P and Q, "KL(P∥Q)→0⇒JS(P∥Q)→0⇔TV(P∥Q)→0⇒EM(P∥Q)→0⇔P→Q". That is, it can be assured that P approaches Q if EM decreases, but the same does not apply to KL, JS, and TV.

Accordingly, let P be the distribution of environment data under a specific condition, and Q be the distribution of environment data generated by applying an action, it can be determined that EM is the most appropriate one as the definition of the similarity degree among the above distances.

Therefore, in this embodiment, a value obtained by inverting the sign of EM (=the Wasserstein distance) is employed as the similarity degree. Accordingly, in step S212, the similarity degree calculation unit 21 trains the similarity degree model that approximates the Wasserstein distance between the distribution of the group of the environment data A and the distribution of the environment data B according to the algorithm of the Wasserstein GAN (generative adversarial network) (WGAN).

Figure 13:
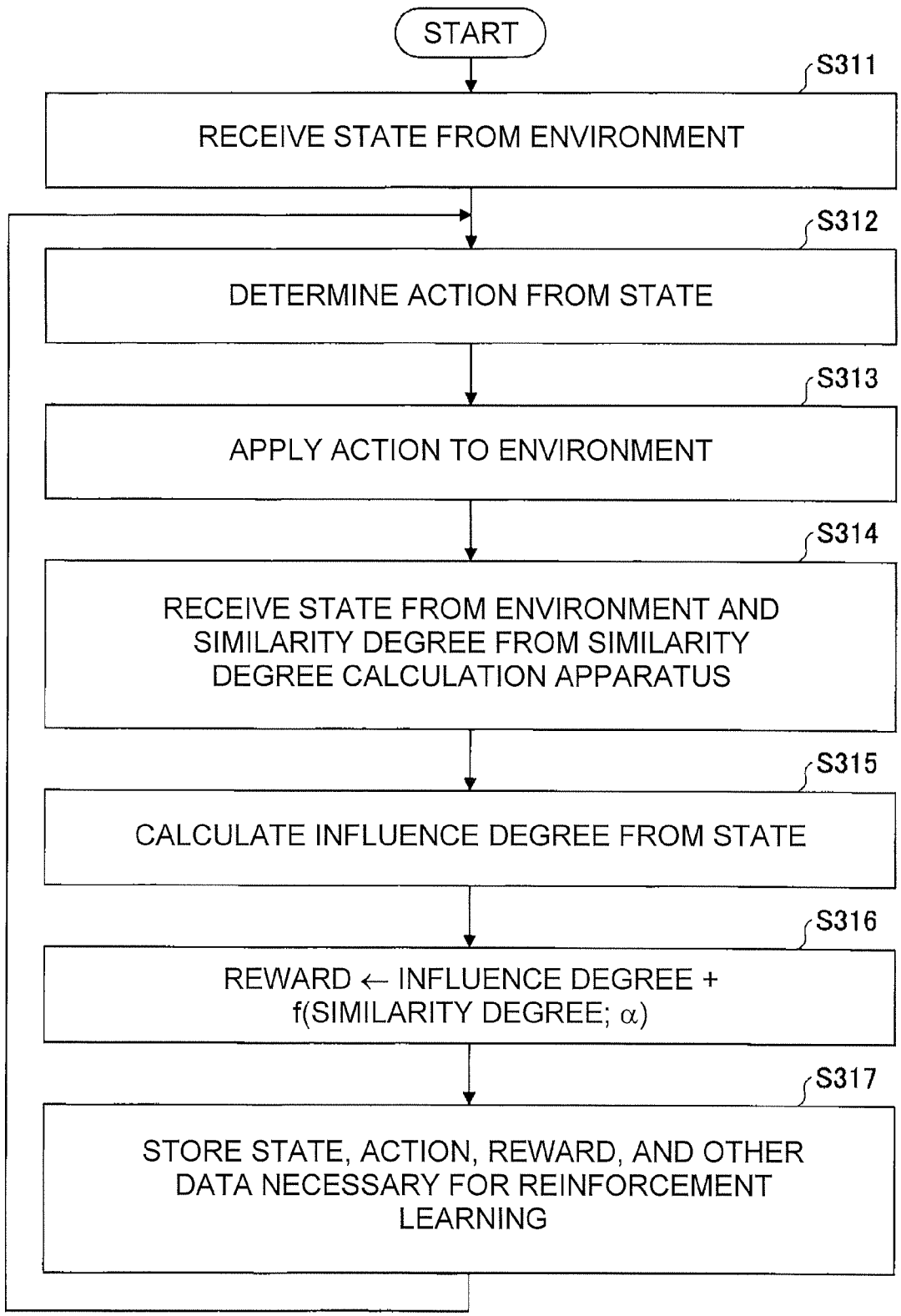
FIG. 13 is a flowchart for describing an example of a processing procedure executed by the agent apparatus 10 in a process of generating training data for an agent unit 11.

Then, details of step S3 in FIG. 9 will be described. FIG. 13 is a flowchart for describing an example of a processing procedure executed by the agent apparatus 10 in the process of generating the training data for the agent unit 11.

In step S311, the agent unit 11 receives or obtains a state from the environment. Then, the agent unit 11 inputs the state to the agent model to determine an action corresponding to the target state (hereinafter referred to as a "target action") (S312). Then, the agent unit 11 applies the target action to the environment (S313).

Then, the agent unit 11 receives or obtains, from the environment, a state changed by applying the target action (hereinafter referred to as a "target state"), and the agent unit 11 receives or obtains, from the similarity degree calculation apparatus 20, the similarity degree calculated by the similarity degree calculation unit 21 based on the environment data B corresponding to the application of the target action (hereinafter referred to as the "target similarity degree") (S314).

Then, the agent unit 11 calculates an influence degree based on the target state (S316). The influence degree is a value indicating the deviation of an index of optimization in the target state from that in the state where the target action is not taken. It is sufficient that the index of optimization is appropriately determined depending on the environment because the index of optimization is different depending on the environment. Further, for example, a variation amount of parameters constituting the state due to the target action may be defined as the influence degree. It is sufficient that a value defined as the influence degree is appropriately selected according to the environment.

Then, the agent unit 11 assigns a result of adding f (the target similarity degree; a) to the influence degree, to a reward (hereinafter referred to as "target reward") (S316). Here, $f(x; x_0)$ is a Lorenz function with x as a variable and $x_0$ as a location parameter. In the Lorenz function, the location parameter $x_0$ corresponds to the peak position of the Lorenz function. In this embodiment, α, which is a parameter preset by a user, is applied to $x_0$. As a result, a serves as a parameter for controlling the similarity degree. That is, as the target similarity degree is closer to a, the value of f (the target similarity degree; a) becomes relatively larger, so that the reward becomes relatively larger. Accordingly, an action whose target similarity degree is closer to a is more likely to be adopted in reinforcement learning of the agent model described later. That is, it is sufficient to set a to a large value if the user wants the agent model to acquire an action with a high similarity degree, or to set a to a small value if the user wants the agent model to acquire an action with a small similarity degree. Thus, it is possible to control an action that the agent model (the neural network) is caused to acquire, based on the closeness (the similarity degree) between the property of the environment in the case where the action is not taken and the property of the environment in the case where the action is taken. In other words, it is possible to intentionally increase or decrease the similarity degree for an action that the agent model (neural network) is caused to acquire.

Note that functions other than the Lorenz function may be used as long as a value that changes based on the relationship between the similarity degree and a parameter set by the user can be used as part or all of the rewards (the value can be included in the rewards) (in particular, as long as a value that increases as the similarity degree is closer to the parameter set by the user can be used as the reward (included in the rewards)).

Then, the agent unit 11 stores the target state, the target action, the target reward, and other data necessary for reinforcement learning in, for example, the auxiliary storage device 102 as training data (S317), and iterates step S312 and the subsequent steps.

Figure 14:
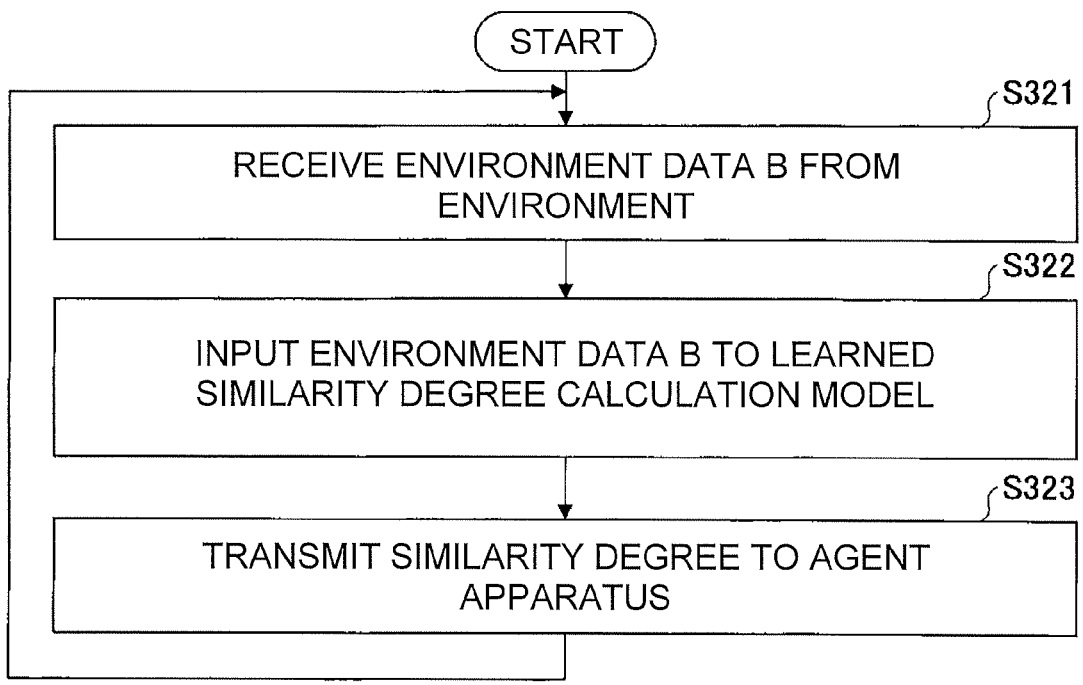
FIG. 14 is a flowchart for describing an example of a processing procedure executed by the similarity degree calculation apparatus 20 in the process of generating training data for the agent unit 11.

FIG. 14 is a flowchart for describing an example of a processing procedure executed by the similarity degree calculation apparatus 20 in the process of generating the training data for the agent unit 11.

In step S321, the similarity degree calculation unit 21 receives or obtains, from the environment, the environment data B corresponding to the action applied to the environment in step S313 in FIG. 13.

Then, the similarity degree calculation unit 21 inputs the received environment data B to the similarity degree calculation model already learned in step S2 in FIG. 9 (S322). As a result, a real value is output from the similarity degree calculation model.

Then, the similarity degree calculation unit 21 transmits a value obtained by inverting the sign of the real value to the agent apparatus 10 as the similarity degree (the similarity degree between the environment data A and the environment data B received or obtained in step S321) (S323), and iterates step S321 and the subsequent steps.

Note that step S3 may be executed, for example, until the action is applied a predetermined number of times, or until a predetermined number of the training data are accumulated in the agent apparatus 10.

Figure 15:
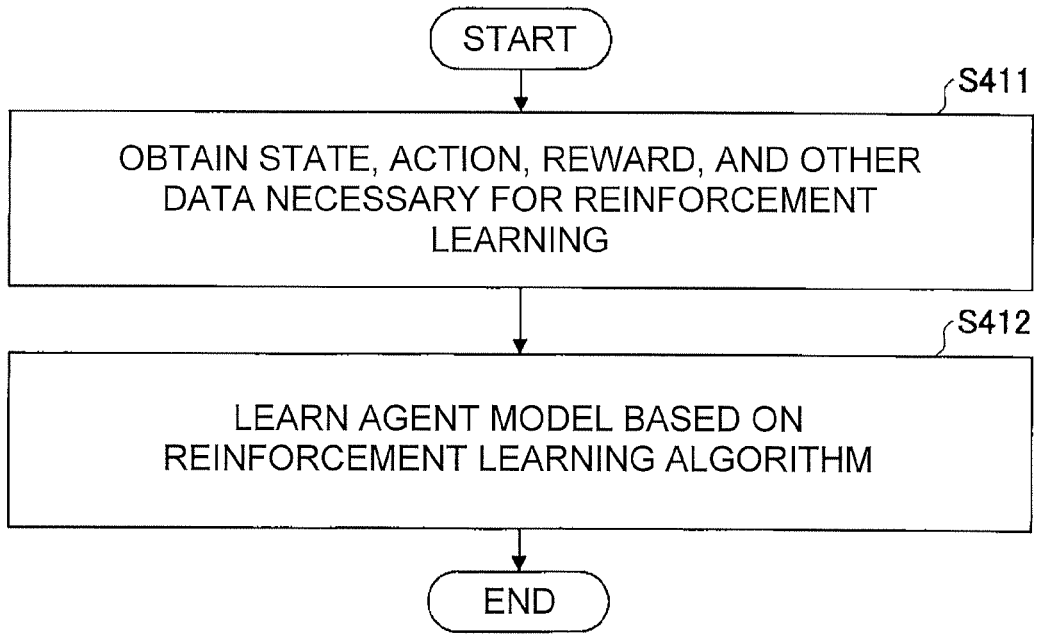
FIG. 15 is a flowchart for describing an example of a processing procedure of a learning process in the agent unit 11.

Then, details of step S4 in FIG. 9 will be described. FIG. 15 is a flowchart for describing an example of a processing procedure of a learning process in the agent unit 11.

In step S411, the agent unit 11 obtains the training data (the state, the action, the reward, and other data necessary for reinforcement learning) accumulated in the agent apparatus 10 in step S3 of the current phase.

Then, the agent unit 11 trains the agent model based on the reinforcement learning algorithm by using the state, the action, the reward, and other data necessary for reinforcement learning as inputs (S412).

Note that although an example in which the smart grid system is the environment has been described above, this embodiment is applicable to various systems that collect data from many devices. For example, when the system to be attacked is an advanced traffic system, it is assumed that injection of false information on the position, speed, or the like of a car inhibits optimal low-delay navigation according to supply and demand of traffic. Therefore, the advanced traffic system may be applied to this embodiment as the environment.

In this case, the environment data is, for example, a set of part or all of values of the positions, speeds, and the like of a plurality of cars to be monitored, or a set of part or all of statistics such as average, variance, percentile, or frequency in the case of summing up the values in a time or space within a certain range.

Further, the similarity degree is a real value representing a distance between the distribution of environment data in the case where no attack is made and the distribution of environment data in the case where an attack is made.

Further, the state is a set of part or all of values of the positions, speeds, and the like of a plurality of cars to be monitored, or a set of part or all of statistics such as average, variance, percentile, and frequency in the case of summing up the values in a time or space within a certain range.

Note that although the environment data and the state have the same definition, parameters constituting the environment data and parameters constituting the state may be different from each other.

Further, the action is a set of part or all of false values of the positions, speeds, and the like of a plurality of cars to be monitored that are injected into the advanced traffic system.

As described above, according to this embodiment, it is possible to control an action that the neural network (the agent model) is caused to acquire, based on the closeness (the similarity degree) between the property of the environment in the case where the action is not applied and the property of the environment in the case where the action is applied.

Note that in this embodiment, the similarity degree calculation unit 21 is an example of a first training unit. The agent unit 11 is an example of a second training unit. The similarity degree calculation model is an example of a second neural network. The agent model is an example of a first neural network. The environment data A is an example of second data. The environment data B is an example of first data and third data.

Although an embodiment of the present invention has been described above in detail, the present invention is not limited to such a specific embodiment, and various variants and modifications can be made within the scope of the spirit of the present invention described in Claims.

REFERENCE SIGNS LIST

10 Agent apparatus
11 Agent unit
20 Similarity degree calculation apparatus
21 Similarity degree calculation unit
30 Environment simulation apparatus
31 Environment simulation unit
100 Drive device
101 Recording medium
102 Auxiliary storage device
103 Memory device
104 CPU
105 Interface device
B Bus

The invention claimed is:
1. An action learning system comprising:
a memory; and
a processor configured to train, based on first data indicating a property of an environment in which data is collected from a plurality of devices and to which an action determined by a first neural network according to a state of the environment is applied and second data indicating a property of the environment to which the action is not applied, a second neural network, train, after the second neural network is trained, the first neural network that determines an action according to the state of the environment, by reinforcement learning using a reward including a value that changes based on a relationship between a similarity degree and a parameter set by a user, the similarity degree being calculated by the second neural network based on third data indicating a property of the environment to which an action determined by the first neural network is applied, wherein the reward is a value that increases as the similarity degree is closer to the parameter set by the user; and generating, by the trained first neural network, an example network attack action that causes a cyberattack to a network to suppress execution of the cyberattack according to the example network attack action, wherein the example network attack action, if executed, causes a damage to the network while maintaining abnormality in the network caused by the cyberattack undetected based on the similarity degree.

2. The action learning system according to claim 1, wherein the reward is a value that increases as the similarity degree is closer to the parameter set by the user.

3. The action learning system according to claim 2, wherein the processor trains the first neural network by reinforcement learning using the reward including a value of a Lorenz function that uses the parameter as a location parameter and the similarity degree as a variable.

4. The action learning system according to claim 1, wherein the processor trains the second neural network according to a GAN (generative adversarial network) algorithm.

5. An action learning method for execution by a computer, the action learning method comprising:

training, based on first data indicating a property of an environment in which data is collected from a plurality of devices and to which an action determined by a first neural network according to a state of the environment is applied and second data indicating a property of the environment to which the action is not applied, a second neural network; and training, after the second neural network is trained, the first neural network that determines an action according to the state of the environment, by reinforcement learning using a reward including a value that changes based on a relationship between a similarity degree is to a parameter set by a user, the similarity degree being calculated by the second neural network based on third data indicating a property of the environment to which an action determined by the first neural network is applied, wherein the reward is a value that increases as the similarity degree is closer to the parameter set by the user; and generating, by the trained first neural network, an example network attack action that causes a cyberattack to a network to suppress execution of the cyberattack according to the example network attack action, wherein the example network attack action, if executed, causes a damage to the network while maintaining abnormality in the network caused by the cyberattack undetected based on the similarity degree.

6. A non-transitory computer-readable recording medium having stored therein a program for causing a computer to execute a process comprising:

training, based on first data indicating a property of an environment in which data is collected from a plurality of devices and to which an action determined by a first neural network according to a state of the environment is applied and second data indicating a property of the environment to which the action is not applied, a second neural network; and training, after the second neural network is trained, the first neural network that determines an action according to the state of the environment, by reinforcement learning using a reward including a value that changes based on a relationship between a similarity degree is to a parameter set by a user, the similarity degree being calculated by the second neural network based on third data indicating a property of the environment to which an action determined by the first neural network is applied, wherein the reward is a value that increases as the similarity degree is closer to the parameter set by the user; and generating, by the trained first neural network, an example network attack action that causes a cyberattack to a network to suppress execution of the cyberattack according to the example network attack action, wherein the example network attack action, if executed, causes a damage to the network while maintaining abnormality in the network caused by the cyberattack undetected based on the similarity degree.

* * * * *